Kenneth W. Zeuner
INVENTOR.

BY John E. Holder

ATTORNEY

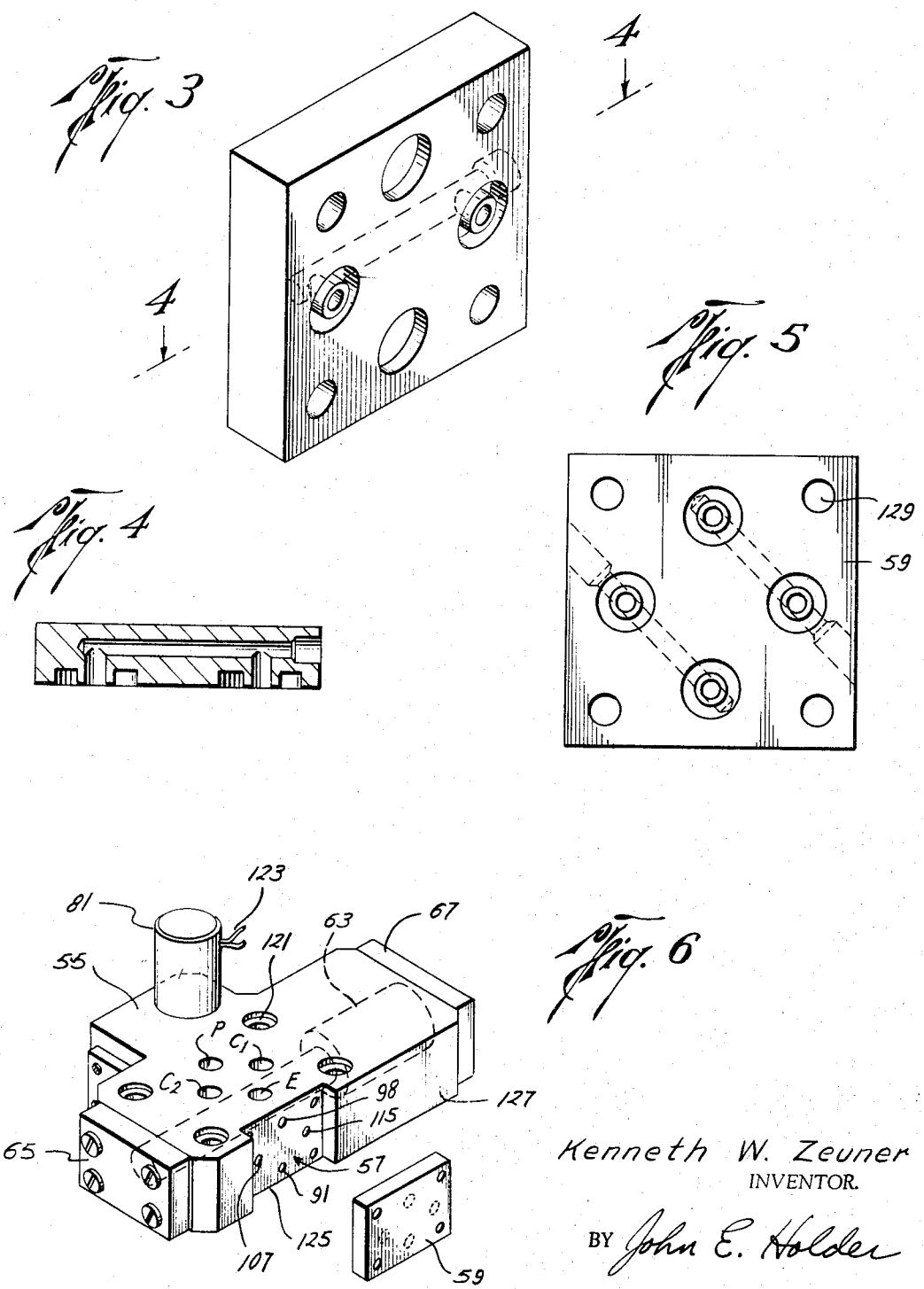

United States Patent Office 3,357,444
Patented Dec. 12, 1967

3,357,444
FLUID FLOW CONTROL
Kenneth W. Zeuner, Levittown, Pa., assignor to Weston Instruments, Inc., Newark, N.J., a corporation of Delaware
Filed Jan. 21, 1965, Ser. No. 427,046
10 Claims. (Cl. 137—270)

ABSTRACT OF THE DISCLOSURE

The particular embodiment described herein as illustrative of one form of the invention utilizes in a fail-safe manifold, a fluid supply under pressure which is diverted through a servo-regulating valve for driving a fluid actuated device. The pressure of the fluid also maintains a fail-safe value in a normally unoperated position. Upon a substantial decrease of fluid pressure to the system or upon the operation of a fluid exhaust valve in response to an external control, the fail-safe valve is automatically moved to a position for connecting the fluid pressure supply directly to the actuated device for fail-safe control.

---

This invention relates to a fluid flow control and, more particularly, to a fluid manifold for controlling the operation of a fluid motor in response to a control indication.

Fluid systems operating fluid motors such as piston-type actuator mechanisms are often used in industrial and space vehicle applications to regulate other fluid systems such as steam, hydraulic, or fuel systems. In such applications it is often desirable to control the operation of the actuator mechanism regulating such other systems in the event a malfunction should occur in the actuator system or in the system being regulated. For example, if temperature or pressure in the control or controlled system were to become critical, it might be desirable to close a valve in a fuel, steam, or hydraulic line in the controlled system. It might also be desirable in such an event to open another valve in say a cooling fluid system or to shut down an entire system.

In any case, it is readily appreciated that in such applications it is often desirable to provide a device for controlling the operation of a fluid motor or actuator in response to an indication of a malfunction or critical limitation in either the fluid motor system or in the system being controlled by the fluid motor.

A typical application of such a control system may be found in a conventional closed-loop actuator position control system where fluid flow is applied to a hydraulic piston which drives a load. The load position is measured electrically and fed block for comparison with a signal representing the desired position. The resulting error signal is amplified providing current input to a servo valve to control flow through the servo valve. Due to the critical tolerances utilized in such systems, mechanical failure of the operating parts of the servo valve is often unavoidable and may be caused for example, by the presence of small particles in the hydraulic fluid. Additionally, the fluid pressure in the hydraulic actuator system may be reduced to a critically low level. Also, an external malfunction may occur in the mechanism or system which is utilizing the hydraulic piston. It is, therefore, desirable to provide a mechanism to be used in conjunction with such a servo valve which will regulate the operation of the actuator in the event of such failure to provide a controlled failure of the actuator system. This, in turn, will insure that the actuator mechanism or hydraulic piston therein will be operated upon such failure in a predetermined manner, i.e., it will fail-safe.

It is, therefore, an object of the present invention to provide a new and improved fail-safe control for a fluid motor system.

More particularly, it is an object of this invention to provide a fail-safe manifold for use with a fluid valve which manifold will operate upon the occurrence of a malfunction in the control or controlled systems to regulate fluid flow to an actuating device.

In a still more specific sense, it is a purpose of this invention to provide a mechanism in a fluid system for selectively controlling the operation of a fluid actuated device in response to a malfunction either in the fluid system or in an external system.

With these and other objects in view, the present invention contemplates a device in a fluid system for controlling the flow of fluid from a regulating valve to a fluid driven device upon the occurrence of a malfunction in the fluid system or in an external system. The device includes a housing having passageways therethrough which connect with the standard fluid ports of the regulating valve. A valve bore is formed in the housing and is arranged to intersect the passageways. A spool valve is slidably received within the valve bore. One end of the valve bore is normally connected to a fluid pressure source for maintaining the spool valve in a first position within the cylinder which position renders the device unoperated. Means are provided at the opposite end of the spool valve for moving the spool valve to a second position upon the release of the fluid pressure from the one end of the valve bore. An electrically operated pilot valve is responsive to a malfunction in the fluid system, reglator valve, or in an external system to connect the pressured end of the valve bore with a low pressure exhaust passage so that the means at the opposite end of the valve is effective to move the spool valve to a second position. In the second position, the spool valve is effective to channel fluid from the pressured fluid supply directly to the fluid driven device, thus shorting the regulating valve. A selector plate is provided on the device for controlling the supply of pressured fluid to the fluid driven device in various modes so that the fluid driven device may be caused to fail-safe in one of several selected modes of operation.

A complete understanding of this invention may be had by reference to the following detailed description when read in conjunction with the accompanying drawings illustrating an embodiment thereof, wherein:

FIG. 3 shows a mode-selector plate;

FIG. 4 is a cross section of the plate taken along line 4—4 of FIG. 3;

FIG. 5 shows another mode-selector plate having an alternative arrangement of interconnecting passages; and FIG. 6 is an isometric view of the fail-safe device showing the position of the selector plate.

Figure 1:
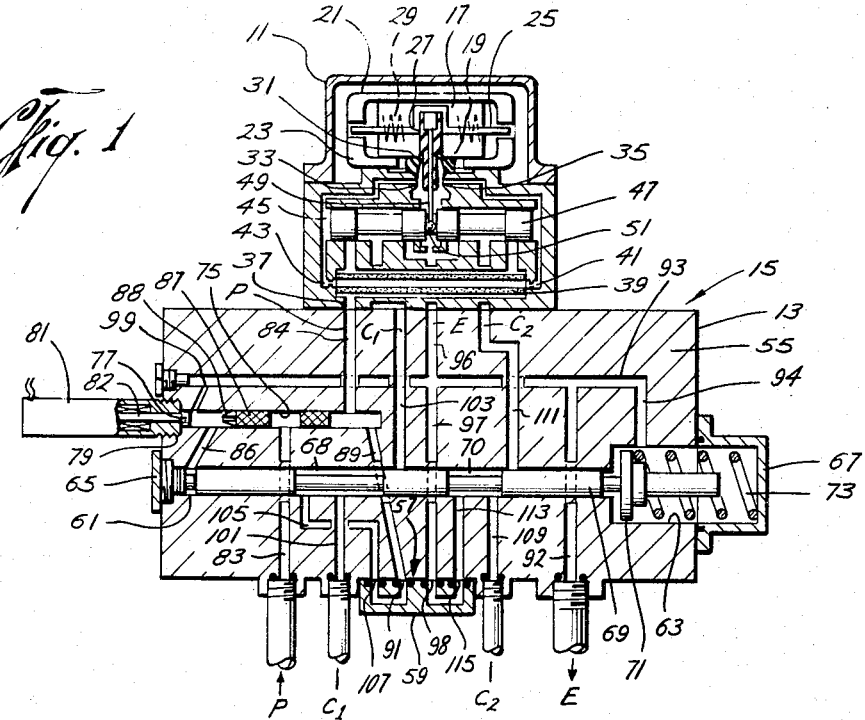
FIG. 1 shows a schematic drawing of an electrically operated servo valve and a fail-safe manifold embodying the principles of the present invention, with the fail-safe manifold in an operative condition.

Referring first to FIG. 1, a servo valve 11 is shown positioned on the upper side of a fail-safe manifold 13 to form an assembly 15. The servo valve 11 is of a type manufactured by Moog Servo Controls Incorporated as their type 30 servo control valve.

The servo valve consists of a polarized electric torque motor having a pair of permanent magnets 17 and 19 arranged in parallel between upper and lower pole pieces 21 and 23. A motor armature 25 extends into air gaps between the pole pieces. The armature is supported by a flexure tube member 27. The flexure tube also acts as a seal between the electromagnetic part of the valve described above and a hydraulic section of the valve. A pair of coils 29 surround the armature 25 with one of the coils located on each side of the flexure tube 27. A flapper 31 is rigidly attached to the midpoint of the armature and extends through the flexure tube 27. The flapper end extending through the flexure tube passes between two nozzles 33 and 35 in the hydraulic section of the valve. The presence of the flapper between the two nozzles creates two variable orifices between the nozzle tips and the flapper. Fluid is provided to the hydraulic section through an inlet port 37. The fluid passes through a filter 39 and is supplied to the two variable orifices through two fixed upstream orifices 41 and 43. The pressures developed in intermediate chambers 45 between the fixed and variable orifices are applied to opposite ends of a spool valve 47 in the hydraulic section.

The spool valve is a conventional sliding valve in which output flow from the valve is proportional to spool displacement from a null position, the spool being shown in the null position in FIG. 1. A cantilever feedback spring 49 is fixed to the armature 25 and extends through the flapper 27 to engage a slot 51 at the center of the spool valve. Displacement of the spool deflects the feedback spring and creates torque on the armature flapper assembly.

As a signal is applied to the motor coils 29, a torque is developed on the armature 25 causing it to pivot about the flexure tube support. The resulting motion of the flapper increases the size of one nozzle orifice and decreases the size of the other. This unbalance between the variable orifices produces a differential pressure in the intermediate chambers 45 which causes spool displacement. As the spool moves, the torque which is proportional to the spool displacement is applied to the armature by the feedback spring. This torque opposes that developed by the motor and a condition of torque equilibrium will exist when the feedback spring torque equals the electrical motor torque. As a result, the flapper is free to move to create a balance between the electrical input torque and feedback spring torque. The balance of these torques produces a direct proportionality between spool displacement and input signal.

Figure 2:
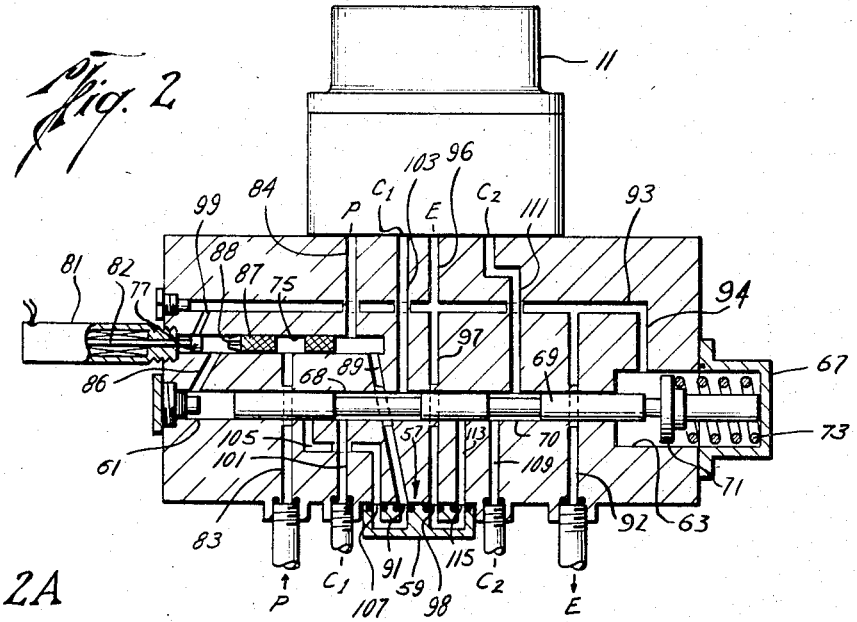
FIG. 2 is a schematic of the fail-safe device in its normally unoperated condition.
Figure 2A:
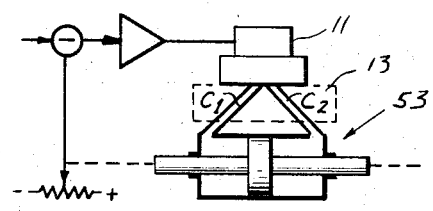
FIG. 2A is a schematic diagram of a servo valve and fail-safe device operatively connected to an actuator mechanism and having an electrical feedback between the actuator and the servo valve.

FIG. 2A shows a schematic representation of the servo valve with control ports $C_1$, $C_2$ of the valve connected to an actuator mechanism 53 which drives a load such as a flow control valve in an industrial process. The position of the load is measured electrically and fed back for comparison with a signal representing the desired position. The resulting signal is amplified for providing current input to the servo valve to control fluid flow therethrough.

If a malfunction should occur in the servo fluid system, it is desirable to lock the actuator mechanism in a desired operating position. It is the purpose of the fail-safe or locking manifold, which is the subject of the present invention, to lock the fluid driven device or actuator in a desired position upon such malfunction. The fail-safe or locking manifold 13 is shown in schematic form in FIGS. 1 and 2. The manifold comprises a housing 55 which is adapted to be joined to the servo valve 11. A series of manifold inlet ports are formed on the upper surface of the manifold to provide for fluid communication with mating ports on the servo valve. A series of corresponding outlet ports are formed on the lower surface of the manifold. Each of these ports on the servo valve and upper and lower surface of the manifold are designated by the letters P, E, $C_1$ and $C_2$ which letter designations represent pressured fluid inlet, fluid exhaust, control 1 and control 2 respectively. The controls 1 and 2 ports connect with the actuator to position the actuator piston. A system of passageways is formed in the manifold between the inlet and outlet ports to provide for fluid communication between the servo valve and the actuator. Also, portions of these passageways extending between the manifold inlet and outlet ports culminate in a closely arranged group of ports 57 on an outside surface of the housing. A selector plate 59 is positioned over the group of ports 57.

A cylindrical valve bore 61 is formed through the interior of the housing from one end surface to the other. An enlarged portion 63 is formed in one end of the bore. A cover plate 65 closes one end of the cylindrical bore while another cover plate 67 encloses the opposite enlarged end portion 63 of the bore. A spool valve 69 is slidably received within the cylindrical bore 61. A pair of recessed or relieved portions 68, 70 are circumferentially formed about the spool valve in a spaced apart relationship. A flange portion 71 is formed on one end of the spool valve and is received in the enlarged portion 63 of the bore. A spring or biasing member 73 is positioned between the flange portion 71 of the spool valve and the end plate 67 covering the enlarged portion of the bore.

Another cylindrical bore 75 to be hereinafter referred to as the pilot valve bore is formed in the housing from an outside surface to a point part way through the housing. A piston or pilot valve 77 is slidably received wtihin the cylindrical bore. An enlarged portion 79 of the bore is threaded to receive a solenoid 81 having a plunger 82 which is operatively connected to the piston valve 77.

The system of passageways which interconnects the inlet and outlet ports P, E, $C_1$ and $C_2$ on the upper and lower surface of the housing will be described with reference to FIG. 2 which shows the fail-safe manifold in an unoperated condition. A passageway 83 is shown extending upwardly from the port P on the lower surface of the manifold housing to intersect the pilot valve bore 75 midway between its ends. Another passageway 84, also intersecting the pilot valve bore extends upwardly to the port P on the upper side of the housing, the port P being in communication with the inlet port on the servo valve. A passageway 86 extends between the pilot valve bore 75 and spool valve bore 61 to provide fluid pressure to one end of the spool valve 69. A filter 87 and restricted orifice 88 are positioned in the pilot valve bore 75 between the intersection of passageways 83 and 86 with the pilot valve bore. A passageway 89 also having one end communicating with the pilot valve bore 75 extends from the bore 75 downwardly at an angle to a port 91, which is one of the ports forming the closely arranged group of ports 57.

Passageways communicating with the exhaust ports E formed on the upper and lower surface of the housing are as follows: a passageway 92 extends vertically upwardly from the exhaust port E on the lower surface of the housing to intersect a horizontal passageway 93. A vertical passage 94 extends downwardly from one end of the passageway 93 to the enlarged bore portion 63 of the spool valve bore 61. A short vertical passageway 96 extends upwardly from the horizontal passageway 93 to communicate with the exhaust port E on the upper surface of the manifold housing. A vertical passageway 97 extends downwardly from the horizontal passageway 93 to a port 98 in the group of ports 57 on the lower side of the housing. A short passageway 99 extends downwardly from the left end of the horizontal passageway 93 to one end of the pilot valve bore receiving the piston valve 77.

The control port $C_1$ on the lower surface of the housing connects with a vertical passageway 101 which extends upwardly to intersect the cylindrical valve bore 61. Another vertical passageway 103, offset laterally from passageway 101, extends upwardly from the valve bore 61 to the $C_1$ port on the upper side of the housing. A passageway 105 in the shape of a dog leg extends downwardly from the valve bore 61 to a port 107 in the closely arranged group of ports 57.

The lower control port $C_2$ communicates with a passageway 109 extending upwardly therefrom to a point in communication with the valve bore 61. Again, a passageway 111, laterally offset from passageway 109, extends upwardly from a point intersecting the valve bore 61 to the control port $C_2$ on the upper surface of the housing. A vertical passageway 113 extends downwardly from the cylindrical valve bore to a port 115 in the closely spaced group of ports 57.

The manifold selector plate 59 which is positioned over the group of ports 57 has passages therein as shown in FIGS. 1 and 2 which connect selected ones of the ports to provide for selectivity in the mode of operation of the fail-safe manifold.

In describing the operation of the apparatus shown in the schematic drawings of FIGS. 1 and 2, reference will first be made to FIGURE 2 which shows the manifold valve in an unoperated condition so that the servo valve is controlling the operation of the actuator as shown in FIG. 2A. A source of fluid under pressure is connected with the lower port P to provide a fluid pressure supply to the entire hydraulic system. This fluid pressure is placed in communication with the valve bore 61 by means of the passage 83. This fluid pressure in turn is transmitted to the passageways 84, 86 and 89 to provide fluid pressure to the servo valve, the one end of the spool valve 69 and to the port 91 communicating with the selector plate 59. The pressured fluid which communicates with passageway 86 must pass through a filter 87 and a restricted orifice 88. The orifice 88 which has an area about one-fourth as large as the pilot valve bore 75 acts as a pressure divider for reasons to be hereinafter explained.

The pressure, which is transmitted through passageway 86 to the left-hand end of the spool valve, forces the spool valve to the right against the spring 73 at the opposite end of the spool valve to maintain the valve in an inoperative position as shown in FIG. 2. In such an inoperative position, pressured fluid comunicating with the selector plate 59 through passageway 89 and port 91 is transmitted through an internal passageway in the plate to port 107 and the passageway 105 which is blocked at its other end by the spool valve 69. The pilot valve piston 77 is held in an inwardly extend position by the solenoid 81 to block off the passageway 99 from communication with the pilot valve bore 75. The upwardly extending vertical passageway 84 which communicates with the valve bore 61 provides a means for the transmission of the fluid under pressure to the servo valve. Fluid entering the servo valve through the upper port P passes through the filter in the servo valve and then through the fixed orifices at each end of the filter. This fluid is transmitted through the nozzle and spool valve to either the exhaust port E or one of the control ports $C_1$ or $C_2$ depending upon the position of the spool valve in the servo valve mechanism.

Still referring to FIG. 2, fluid leaving the servo valve through the port E passes downwardly through the passageway 96 into the long horizontal passageway 93. Passageway 96 is connected with the downwardly extending passageway 92 thereby providing communication with the exhaust port E on the lower side of the housing. Also, any fluids passing through the control ports $C_1$ and $C_2$ in the servo valve are transmitted to the cylindrical valve bore 61 by means of passageways 103 and 111 respectively. Fluid flowing through passageway 103 from control port $C_1$ is permitted to pass into the valve bore 61 by means of the recessed portion 68 formed on the spool valve and from there the fluid passes into the downwardly extending vertical passageway 101 which is in communication with the lower control port $C_1$ on the lower surface of the housing. Fluid exiting the servo valve through the control port $C_2$ and passageway 111 then passes into the valve bore 61 by means of the other recessed portion 70 on the spool valve and thence into the downwardly extending vertical passageway 109 to control port $C_2$ on the lower surface of the housing. Thus, when the fail-safe manifold is in an unoperated condition as shown in FIG. 2, it is readily seen that the manifold does not alter the effect of the flow of fluid from the servo valve.

The solenoid operated pilot valve is connected to a control device (not shown) which is responsive to a malfunction in the servo system or to a malfunction in an external system which may be under the control of the servo system. Upon the occurrence of such malfunction, the control device de-energizes the solenoid thereby moving the plunger 82 and piston 77 to the left as viewed in FIG. 1 to open the passageway 99 to communication with the interior of the pilot valve bore 75. The other end of the passageway 99 is in communication with the long horizontal passageway 93 which in turn communicates with the exhaust ports E. This movement of the piston upon de-energization of the solenoid is therefore effective to place part of the pilot valve bore 75, passageway 86, and the left end of the spool valve bore in communication with the exhaust system of the manifold through the passageway 99. This relieves the pressure on the left end of the spool valve and thereby renders the biasing spring 73 at the opposite end of the spool valves effective to move the spool valve to the left in the cylindrical valve bore. The restricted orifice 88 in the bore 75 prevents that part of the bore 75 to the right of the orifice from being placed at exhaust pressure so that the passageway 89 communicating with the bore 75 will be maintained under sufficient pressure to operate the actuator mechanism when the fail-safe manifold is in an operated condition.

As shown in FIG. 2, this movement of the spool valve shifts the position of the recesses 68 and 70 in the bore 61 to close off passageways 103 and 111 communicating with the upper control ports $C_1$ and $C_2$. At the same time, the shifting of the spool valve is effective to place the recesses 68 and 70 over the openings to passageways 105 and 113 which communicate respectively with ports 107 and 115 covered by the manifold selector plate 59. By means of the selective arrangement of passages in the selector plate, the control ports $C_1$, $C_2$ on the lower surface of the housing will now be connected with the pressure and exhaust lines respectively. Therefore, as described above with respect to the operation of the fail-safe manifold, such operation is effective to close off the control ports $C_1$, $C_2$ on the lower surface of the manifold housing from the upper ports $C_1$, $C_2$ and reconnect the lower control ports directly to the pressure and exhaust lines thus shorting the servo valve from the fluid system. Different modes of operation may be selected to effect a desired operation of the actuator mechanism by varying the arrangement of passageways in the manifold selector plate.

In the arrangement of passages shown in FIG. 1, the pressure line is connected through the passageways 83, 89, 105 and 101 to the control port $C_1$. At the same time the exhaust line is connected through the passageways 92, 93, 97, 113 and 109 to the control port $C_2$. As a result, the actuator mechanism shown in FIG. 2A would be moved to the right and held in such a position by the flow of fluid through the fail-safe manifold. By reorienting or changing the selector plate 59 covering the grouped ports 57 on the exterior of the housing, the interconnection of the control ports $C_1$ and $C_2$ with the pressure and exhaust ports may be rearranged to provide movement of the actuator to the left, fixing of the actuator at its position upon failure of the system, or equalization of the control ports permitting free movement of the actuator by external forces. The arrangement of the selector plate permitting the above modes of operation will be hereinafter described in detail.

FIG. 6 shows the structural detail of the fail-safe or locking manifold. Four mounting holes 121 which extend through the housing are provided for attaching the fail-safe manifold to the servo valve housing. The solenoid 81 for moving the plunger 82 and piston 77 in the pilot valve bore 75 (FIGS. 1 and 2) is shown extending upwardly from the manifold housing 55. Lead wires 123 are provided for connecting the solenoid to an electrical control system to actuate the fail-safe manifold. The end plates 65 and 67 are shown positioned on opposite ends of the housing for covering the ends of the spool valve bore 63 formed longitudinally through the housing as shown by the dotted lines in FIG. 6. The upper ports P, E, C₁ and C₂ are shown as they are formed in the upper surface of the manifold housing. These ports are arranged to mate with similar ports on the bottom of the servo valve. Likewise the lower ports in the manifold are also similarly arranged to provide interconnection with the actuator mechanism and the pressure and exhaust lines. A rectangular recessed portion 125 is formed on a front face 127 of the housing. Portions of the passageways formed within the housing are shown culminating in the closely arranged group of ports 57 in the recessed portion 125 of the housing. The selector plate 59 which provides for a selection of the modes in which the locking manifold will operate, is shown, for purposes of clarity, disassembled from its normal position in the recess 125.

The above-described selector plate is shown in greater detail in FIG. 5 wherein pairs of the ports are connected by passageways (shown in dotted lines) formed in the interior of the plates. This arrangement of passageways will provide two modes of operation of the manifold depending upon the orientation of the selector plate. The orientation of the plate as shown in FIG. 6 will interconnect ports 98, 115 and ports 107, 91 which is the same interconnection of ports as shown in FIG. 1. It is readily seen that by rotating the selector plate 90°, passageways in the plate 59 would interconnect ports 98, 107 and ports 91, 115 to cause the actuator piston to be moved to the left and held upon operation of the fail-safe manifold. Mounting holes 129 are provided on the selector plate for connecting the plate to the housing in the recessed portion 125 formed on the front face 127 of the housing.

An alternative selector plate is shown in FIG. 3 which provides a single passageway between the ports 107 and 115. Ports 107 and 115 are connected to the C₁ and C₂ ports on the lower side of the housing by various passageways as shown in FIG. 2 when the fail-safe manifold is operated. Therefore with the selector plate shown in FIG. 3, fluid communication is established directly between the control ports to provide floating or free movement of fluid from one side of the actuator piston to the other to permit free movement of the piston by the load connected to the actuator. Another mode of operation is provided by utilizing a plate which blocks off all of the ports in the group of ports 57 so that the actuator, upon operation of the fail-safe manifold, will be locked in its position at the time of operation of the fail-safe manifold.

Because the solenoid pilot valve is normally energized to prevent operation of the fail-safe manifold, any electrical failure to the system will cause automatic operation of the fail-safe manifold. Also, since the fail-safe manifold is maintained in an unoperated condition by fluid pressure on the spool valve, any failure in the fluid pressure system will automatically operate the fail-safe manifold. While an actuator mechanism has been described to exemplify the operation of the fail-safe manifold, it is readily seen that the fail-safe manifold is applicable to any fluid system wherein it is desired to control the system upon the occurrence of a particular event. Such an event, of course, would not be limited to malfunctions in fluid systems but could be any event by which it would be desirable to control a fluid system in the manner afforded by the fail-safe manifold.

While particular embodiments of the present invention have been shown and described, it is apparent that changes and modifications may be made without departing from this invention in its broader aspects and, therefore, the aim in the appended claims is to cover all such changes and modifications as fall within the true spirit and scope of this invention.

What is claimed is:

1. In a manifold apparatus for automatically controlling the flow of fluid between a regulating valve and a fluid driven device in response to the occurrence of an event, fluid supply means for directing fluid under pressure to the regulating valve, means forming passages for directing fluid from the regulating valve to the fluid driven device, normally closed means forming diverting channels for directing fluid from said fluid supply means to said fluid driven device, selectively operable means for closing said passage means and for opening said diverting channel means, and means responsive to the occurrence of said event for operating said closing and opening means.

2. A manifold apparatus for controlling the flow of fluid from a regulating valve to a fluid driven device in response to the occurrence of an event, comprising: a housing defining passage means for supplying fluid to said regulating valve, channels formed in said housing for directing fluid from said regulating valve to said fluid driven device, diverting passageways in said housing connecting said passage means to said channels for diverting fluid from said passage means directly to said fluid driven device, selectively operable means in said housing for closing said channels and for opening said diverting passageways, and means responsive to the occurrence of said event for operating the closing and opening means.

3. In a valve for regulating the flow of fluid to a fluid driven device, the combination of means for controlling the flow of fluid to said fluid driven device upon the occurrence of an event, which means comprises: a housing defining a plurality of passages for connecting said regulating valve with said fluid driven device, said passages having portions culminating in a group of closely adjacent ports, conveniently removable means overlying said ports for controlling the flow of fluid between said ports, selectively operable means in said housing for opening and closing said passages to fluid flow, and means responsive to the occurrence of said event for operating the opening and closing means.

4. In a manifold apparatus for automatically controlling the flow of fluid between a regulating valve and a fluid driven device in response to the occurrence of an event, fluid supply means for directing fluid under pressure to the regulating valve, means forming passages for directing fluid from the regulating valve to the fluid driven device, normally closed means forming diverting channels for directing fluid from said fluid supply means to said fluid driven device, said diverting channels having portions culminating in a group of ports, removable means overlying said ports for controlling the flow of fluid between said ports, selectively operable means for closing said passage means and for opening said diverting channel means, and means responsive to the occurrence of said event for operating said closing and opening means.

5. In a valve mechanism for regulating the flow of pressured fluid to a fluid driven device, the combination of means for controlling the flow of fluid to said fluid driven device upon the occurrence of an event, which means comprises: a housing defining passages for connecting said regulating valve mechanism with said fluid driven device, chamber means formed in said housing and intersecting said passages, said passages having portions culminating in a group of ports arranged in a single plane on the outside surface of said housing, a conveniently removable member arranged to overlie and selectively interconnect said group of ports, control valve means movable in said chamber for opening and closing said passages, means for transmitting pressured fluid to one end of said control valve means to maintain said control valve means in a first position, means operable upon the venting of the pressured fluid at one end of said control valve means for moving said control valve to a second position, and means responsive to the occurrence of said event for venting said pressured fluid from one end of said control valve means.

6. The combination of a valve mechanism for controlling the flow of pressured fluid to a fluid motor and means for controlling the flow of fluid to said fluid motor upon the occurrence of an event, comprising: a series of ports in said valve mechanism including a pressured fluid inlet port, an exhaust port, and at least two control ports; a housing defining passages which connect said control ports in said valve mechanism with said fluid motor and connect said inlet and exhaust ports with fluid supply and reservoir means; said housing defining a valve chamber which intersects said passages, a spool valve movable in said chamber for interconnecting and closing off said passages, means for transmitting pressured fluid to one end of said spool valve to maintain said spool valve in a first position, means operable upon exhausting of the pressured fluid at one end of said spool valve for moving said spool valve to a second position, and means responsive to the occurrence of said event for exhausting said pressured fluid from one end of said spool valve.

7. The combination of an electrically operable valve mechanism for controlling the flow of pressured fluid to a fluid motor and means for controlling the flow of fluid to said fluid motor in a variety of modes upon the occurrence of an event, comprising: a series of ports in said valve mechanism including a pressured fluid inlet port, an exhaust port, and at least two control ports; a housing defining passages which connect said control ports in said valve mechanism with said fluid motor and also connect said inlet and exhaust ports with fluid supply and reservoir means; a valve cylinder formed in said housing and intersecting said passages; means for selectively connecting the passages in a variety of modes; a spool valve movable in said cylinder for interconnecting and closing off said intersected passages, means for transmitting pressured fluid to one end of said spool valve to maintain said spool valve in a first position; means operable upon exhausting of the pressured fluid at one end of said spool valve for moving said spool valve to a second position; and normally energized electrical means responsive to the occurrence of said event to become de-energized for exhausting said pressured fluid from one end of said spool valve.

8. In an apparatus for controlling the flow of fluid; regulating valve means for controlling the flow of fluids from a fluid supply means to a fluid driven device, a housing defining first passage means for supplying fluid from said fluid supply means to said fluid driven device via said regulating valve means and second passage means for supplying fluid from said fluid supply means directly to said fluid driven device, chamber means formed in said housing and intersecting said first and second passage means, control means movable in said chamber means for closing said first passage means and opening said second passage means, and means responsive to the occurrence of an event for moving said control means in said chamber means.

9. The apparatus set forth in claim 8 wherein said event occurs when the pressure of fluid supplied to said regulating valve drops to a predetermined level.

10. The apparatus of claim 8 and further including normally energized electrical means responsive to the occurrence of said event to become de-energized for permitting movement of said control means in said chamber means.

References Cited

UNITED STATES PATENTS

| | | | |
|---|---|---|---|
| 2,197,743 | 4/1940 | Crafts et al. | 137—28 X |
| 2,335,923 | 12/1943 | Dube | 137—270 |
| 3,209,782 | 10/1965 | Wolpin et al. | 137—625.63 |

M. CARY NELSON, *Primary Examiner.*

W. J. JOHNSON, *Assistant Examiner.*

Disclaimer and Dedication 3,357,444.—*Kenneth W. Zeuner*, Levittown, Pa. FLUID FLOW CONTROL. Patent dated Dec. 12, 1967. Disclaimer and dedication filed Feb. 4, 1970, by the assignee, *Weston Instruments, Inc.*

Hereby enters this disclaimer to the entire remaining term of said patent and dedicates the patent to the Public.

[*Official Gazette May 26, 1970.*]